(12) United States Patent
Yoon et al.

(10) Patent No.: US 9,371,757 B2
(45) Date of Patent: Jun. 21, 2016

(54) CATALYTIC CONVERTER OF INTERNAL COMBUSTION ENGINE AND APPARATUS FOR PURIFYING EXHAUST GAS PROVIDED WITH THE SAME

(71) Applicant: Hyundai Motor Company, Seoul (KR)

(72) Inventors: Ki Young Yoon, Seoul (KR); Chibum In, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 343 days.

(21) Appl. No.: 13/948,822

(22) Filed: Jul. 23, 2013

(65) Prior Publication Data

US 2014/0186227 A1    Jul. 3, 2014

(30) Foreign Application Priority Data

Dec. 28, 2012    (KR) .................... 10-2012-0157475

(51) Int. Cl.
| | |
|---|---|
| *F01N 3/28* | (2006.01) |
| *B01D 53/94* | (2006.01) |
| *F01N 3/10* | (2006.01) |
| *F01N 3/035* | (2006.01) |

(52) U.S. Cl.
CPC ............... *F01N 3/101* (2013.01); *F01N 3/035* (2013.01); *F01N 2510/02* (2013.01); *F01N 2510/0682* (2013.01); *F01N 2510/0684* (2013.01); *Y02T 10/22* (2013.01)

(58) Field of Classification Search
None
See application file for complete search history.

(56) References Cited

U.S. PATENT DOCUMENTS

| | | | | |
|---|---|---|---|---|
| 5,538,697 | A * | 7/1996 | Abe ..................... | B01D 53/945 422/169 |
| 7,534,738 | B2 | 5/2009 | Fujdala et al. | |
| 2003/0202918 | A1* | 10/2003 | Ashida ................. | B01D 53/945 422/180 |
| 2010/0257843 | A1 | 10/2010 | Hoke et al. | |
| 2011/0030346 | A1* | 2/2011 | Neubauer ............ | B01D 53/944 60/274 |

FOREIGN PATENT DOCUMENTS

| | | |
|---|---|---|
| EP | 1 357 269 A2 | 10/2003 |
| EP | 1 969 214 B1 | 9/2010 |

* cited by examiner

*Primary Examiner* — Walter D Griffin
*Assistant Examiner* — Jelitza Perez
(74) *Attorney, Agent, or Firm* — Morgan, Lewis & Bockius LLP

(57) ABSTRACT

A catalytic converter of an internal combustion engine may include: at least one inlet channel having an end through which an exhaust gas is flowed into and the other end which is blocked; at least one outlet channel having an end which is blocked and the other end through which the exhaust gas is discharged; and a wall defining a boundary between neighboring inlet channel and outlet channel, and adapted to flow the exhaust gas from the inlet channel to the outlet channel, wherein the wall includes a single-layered portion formed at an end portion and having a three-way catalyst layer, and a multi-layered portion being the portion other than the single-layered portion and having a three-way catalyst layer, a hydrocarbon trap layer and an insulating layer. An apparatus of purifying an exhaust gas is also provided.

8 Claims, 5 Drawing Sheets

CATALYTIC CONVERTER OF INTERNAL COMBUSTION ENGINE AND APPARATUS FOR PURIFYING EXHAUST GAS PROVIDED WITH THE SAME

CROSS-REFERENCE TO RELATED APPLICATION

The present application claims priority of Korean Patent Application Number 10-2012-0157475 filed Dec. 28, 2012, the entire contents of which application is incorporated herein for all purposes by this reference.

BACKGROUND OF INVENTION

1. Field of Invention

The present invention relates to a catalytic converter of an internal combustion engine and an apparatus of purifying an exhaust gas provided with the same. More particularly, the present invention relates to a catalytic converter of an internal combustion engine and an apparatus of purifying an exhaust gas provided with the same that can effectively remove harmful material including hydrocarbon which is largely generated at an initial starting.

2. Description of Related Art

Recently, gasoline direct injection (GDI) engines are increasingly used in order to improve fuel economy and performance of an internal combustion engine. In a typical gasoline engine, fuel (gasoline) is injected into an intake manifold and is mixed with intake air so as to generate air-fuel mixture. After that, the air-fuel mixture is supplied into a combustion chamber. The GDI engine, however, uses fuel injection method where gasoline is injected directly into the combustion chamber.

Since the GDI engine causes the air/fuel ratio around a spark plug to be rich, the GDI engine has advantages that the engine can be operated at lean air/fuel ratio. However, since the fuel is directly injected into the combustion chamber, the fuel is not fully mixed with the intake air and incomplete combustion region may increase in the combustion chamber according to the GDI engine. Such increase of the incomplete combustion region may result in increase of particulate material and increase of harmful material contained in the exhaust gas.

Recently, technology for mounting a particulate filter at an exhaust pipe of a vehicle provided with a GDI engine as well as for mounting additional catalytic converters besides a three-way catalyst that has been used in the typical gasoline engine is being developed.

Even though the additional catalytic converter is mounted at the exhaust pipe, it is very difficult to remove harmful material contained in the exhaust gas until a temperature of the exhaust gas reaches an activation temperature of the catalyst in a case of cold starting where the temperature of the exhaust gas is very low. Particularly, material such as hydrocarbon is largely generated at an initial starting, but the hydrocarbon generated largely at the initial starting cannot be purified at the catalytic converter and is discharged to the exterior of a vehicle.

Furthermore, the exhaust gas is not purified and is discharged to the exterior of the vehicle at the initial starting in most of the internal combustion engines.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a catalytic converter of an internal combustion engine and an apparatus of purifying an exhaust gas provided with the same having advantages of effectively removing harmful material such as hydrocarbon at an initial starting as a consequence that an insulating layer retards temperature rise of a hydrocarbon trap layer until a temperature of a three-way catalyst layer reaches an activation temperature.

A catalytic converter of an internal combustion engine according to various aspects of the present invention may include: at least one inlet channel having an end through which an exhaust gas is flowed into and the other end which is blocked; at least one outlet channel having an end which is blocked and the other end through which the exhaust gas is discharged; and a wall defining a boundary between neighboring inlet channel and outlet channel, and adapted to flow the exhaust gas from the inlet channel to the outlet channel, wherein the wall includes a single-layered portion formed at an end portion and having a three-way catalyst layer, and a multi-layered portion being the portion other than the single-layered portion and having a three-way catalyst layer, a hydrocarbon trap layer and an insulating layer.

The three-way catalyst layer, the hydrocarbon trap layer and the insulating layer of the multi-layered portion may be disposed in a sequence of the insulating layer, the hydrocarbon trap layer and the three-way catalyst layer from the inlet channel toward the outlet channel.

The insulating layer may prevent heat of the exhaust gas from being transferred to the hydrocarbon trap layer by moisture adsorption.

A length of the single-layered portion may be 10%-50% of a length of the wall, and a length of the multi-layered portion may be 50%-90% of the length of the wall.

The catalytic converter may be a catalyzed particulate filter in which a catalyst is coated.

An apparatus of purifying an exhaust gas according to other aspects of the present invention may include: an engine generating power by burning fuel and air flowing into a combustion chamber; an exhaust pipe through which the exhaust gas generated at the engine passes; a first three-way catalyst mounted at an exhaust pipe downstream of the engine, and converting harmful material such as carbon monoxide, hydrocarbon, and nitrogen oxide contained in the exhaust gas into harmless material through oxidation-reduction reaction; and a catalytic converter mounted at the exhaust pipe downstream of the first three-way catalyst, and removing harmful material of the exhaust gas that is not removed at the first three-way catalyst, wherein the catalytic converter includes at least one inlet channel having an end through which an exhaust gas is flowed into and the other end which is blocked, at least one outlet channel having an end which is blocked and the other end through which the exhaust gas is discharged; and a wall defining a boundary between neighboring inlet channel and outlet channel, and adapted to flow the exhaust gas from the inlet channel to the outlet channel, and wherein the wall includes a single-layered portion formed at an end portion and having a three-way catalyst layer, and a multi-layered portion being the portion other than the single-layered portion and having a three-way catalyst layer, a hydrocarbon trap layer and an insulating layer.

The three-way catalyst layer, the hydrocarbon trap layer and the insulating layer of the multi-layered portion may be disposed in a sequence of the insulating layer, the hydrocarbon trap layer and the three-way catalyst layer from the inlet channel toward the outlet channel.

The insulating layer may prevent heat of the exhaust gas from being transferred to the hydrocarbon trap layer by moisture adsorption.

A length of the single-layered portion may be 10%-50% of a length of the wall, and a length of the multi-layered portion may be 50%-90% of the length of the wall.

The catalytic converter may be a catalyzed particulate filter in which a catalyst is coated.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
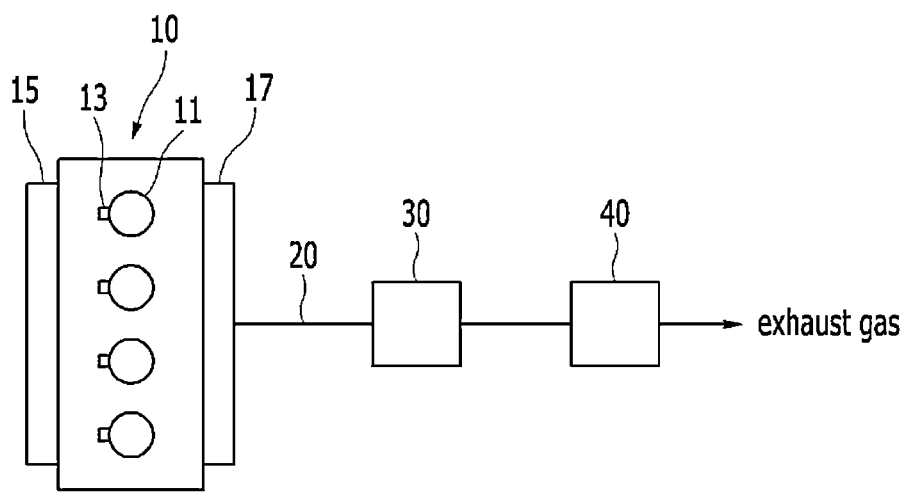
FIG. 1 is a schematic diagram of an apparatus of purifying an exemplary exhaust gas according to the present invention.

FIG. 1 is a schematic diagram of an apparatus of purifying an exhaust gas according to various embodiments of the present invention.

As shown in FIG. 1, an apparatus of purifying an exhaust gas according to various embodiments of the present invention includes an engine 10, an exhaust pipe 20, a first three-way catalyst 30 and a catalytic converter 40.

The engine 10 burns fuel and air to convert chemical energy into mechanical energy. The engine 10 may include a plurality of combustion chambers 11 into which the fuel and the air flow, and an ignition device igniting the fuel and the air flowing into the combustion chamber 11. The engine 10 is connected to an intake manifold 15 so as to receive the air in the combustion chamber 11, and is connected to an exhaust manifold 17. Therefore, an exhaust gas generated at combustion process is gathered in the exhaust manifold 17 and is then discharged to an outside of the engine 10. An injector 13 may be mounted in the combustion chamber 11 in order to inject the fuel directly into the combustion chamber 11.

A gasoline direct injection (GDI) engine is exemplified in this specification, but various embodiments of the present invention is not limited to the GDI engine. It is to be understood that various types of gasoline engines other than the GDI engine can be used. In this case, the injector is mounted at the intake manifold 15 or an intake pipe and injects the fuel thereto.

In addition, a diesel engine may be used. In this case, the ignition device is not mounted in the combustion chamber 11.

The exhaust pipe 20 is connected to the exhaust manifold 17 and exhausts the exhaust gas to the exterior of a vehicle. The first three-way catalyst 30 and the catalytic converter 40 are mounted on the exhaust pipe 20 and remove hydrocarbon, carbon monoxide and nitrogen oxide contained in the exhaust gas.

The first three-way catalyst 30 is mounted on the exhaust pipe 20 downstream of the engine 10, and removes harmful material contained in the exhaust gas exhausted from the engine 10 through oxidation-reduction reaction. Generally, the first three-way catalyst 30 converts three harmful material (CO, HC, NOx) contained in the exhaust gas into harmless gas ($CO_2$, $H_2O$, $N_2$) through the oxidation-reduction reaction. The first three-way catalyst 30 is provided with oxygen-storing material such as ceria, oxidation catalyst such as palladium and platinum, and reduction catalyst such as rhodium coated thereon. Since the three-way catalyst is well known to a person of an ordinary skill in the art, detailed description thereof will be omitted.

The catalytic converter 40 is mounted on the exhaust pipe 20 downstream of the first three-way catalyst 30. The catalytic converter 40 is configured to remove hydrocarbon, carbon monoxide and nitrogen oxide remaining in the exhaust gas that has passed through the first three-way catalyst 30. In addition, the catalytic converter 40 may be a catalyzed particulate filter on which a catalyst is coated. In this case, the catalytic converter 40 can trap particulate matter contained in the exhaust gas.

Hereinafter, the catalytic converter 40 will be described in further detail.

Figure 2:
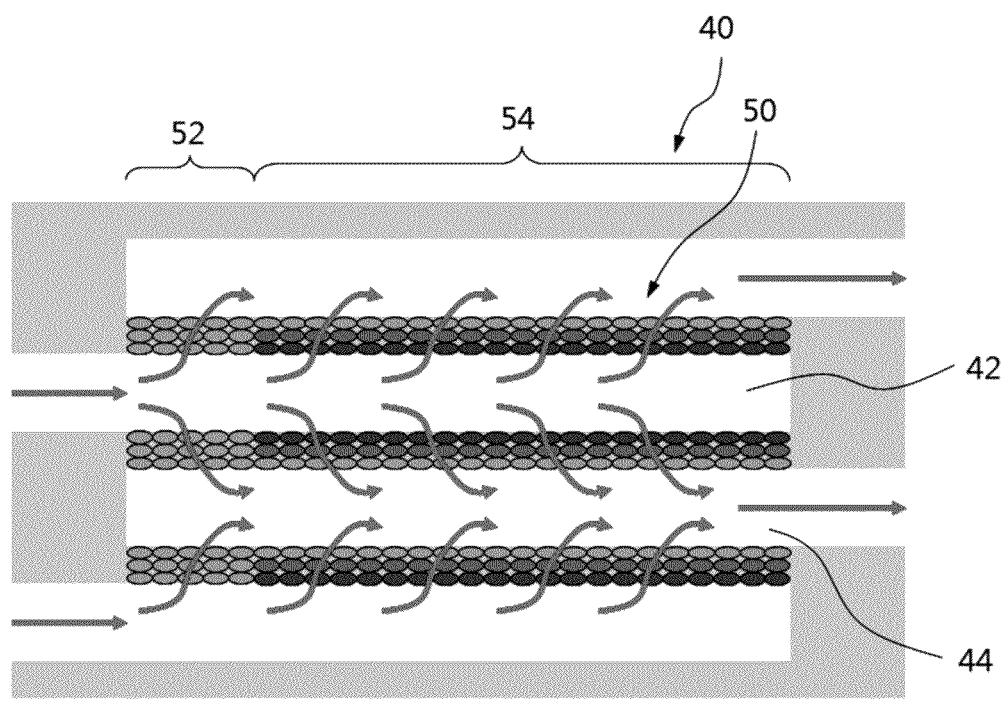
FIG. 2 is a partial cross-sectional view of an exemplary catalytic converter according to the present invention.
Figure 3:
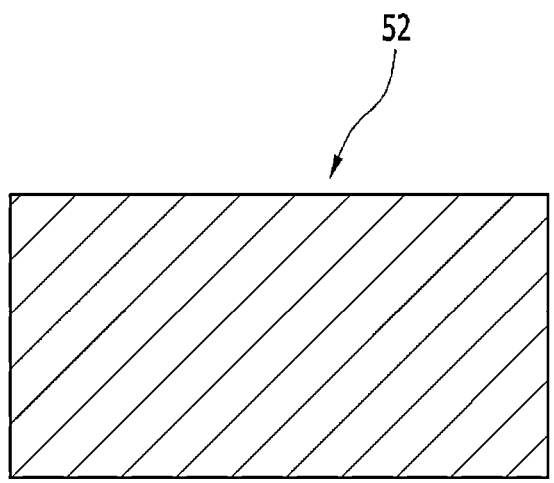
FIG. 3 is a cross-sectional view of a single-layered portion in an exemplary catalytic converter according to the present invention.
Figure 4:
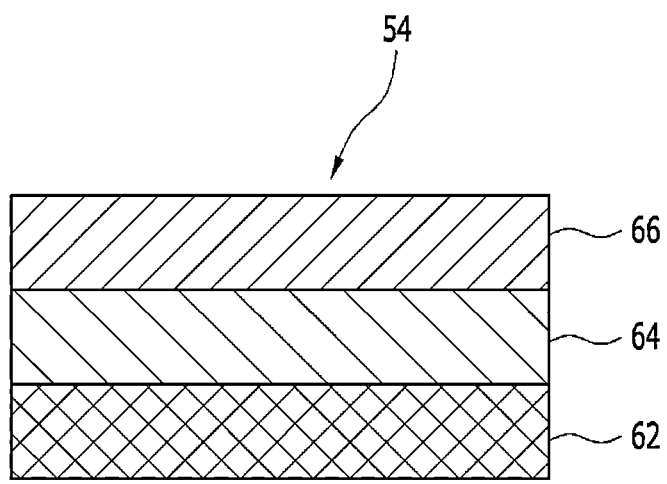
FIG. 4 is a cross-sectional view of a multi-layered portion in an exemplary catalytic converter according to the present invention.

FIG. 2 is a partial cross-sectional view of a catalytic converter according to various embodiments of the present invention; FIG. 3 is a cross-sectional view of a single-layered portion in a catalytic converter according to various embodiments of the present invention; and FIG. 4 is a cross-sectional view of a multi-layered portion in a catalytic converter according to various embodiments of the present invention.

As shown in FIG. 2, the catalytic converter 40 according to various embodiments of the present invention includes a plurality of channels 42 and 44 formed therein. The channels 42 and 44 include inlet channels 42 and outlet channels 44.

The inlet channel 42 is a channel into which the exhaust gas passing through the first three-way catalyst 30 flows. For this purpose, an end (a left end in the drawing) of the inlet channel 42 is open and the other end (a right end in the drawing) of the inlet channel 42 is blocked by a channel plug.

The outlet channel 44 is a channel through which the exhaust gas in the catalytic converter 40 flows to the exhaust pipe 20. For this purpose, an end (a left end in the drawing) of the outlet channel 44 is blocked by a channel plug and the other end (a right end in the drawing) of the outlet channel 44 is open.

The inlet channel 42 and the outlet channel 44 are formed substantially in parallel with each other. A wall 50 is formed between neighboring inlet channel 42 and outlet channel 44 and defines a boundary between the inlet channel 42 and the outlet channel 44. Since the wall 50 is made of porous material, the exhaust gas can pass through the wall 50 but the particulate matter contained in the exhaust gas cannot pass through the wall 50. Therefore, the exhaust gas flows into the catalytic converter 40 through the inlet channel 42 and is discharged from the catalytic converter 40 through the outlet channel 44 after passing through the wall 50. At this time, the particulate matter is trapped at the other end portion of the inlet channel 44.

As shown in FIG. 2, the wall 50 includes a single-layered portion 52 and a multi-layered portion 54.

The single-layered portion 52 is disposed at the end portion of the catalytic converter 40. As shown in FIG. 3, the single-layered portion 52 includes a three-way catalyst layer. That is, a three-way catalyst is coated on the single-layered portion 52. The three-way catalyst layer, similar to the first three-way catalyst 30, converts three harmful material (CO, HC, NOx) contained in the exhaust gas into harmless gas (CO2, H2O, N2) through the oxidation-reduction reaction. The three-way catalyst layer is provided with oxygen-storing material such as ceria, oxidation catalyst such as palladium and platinum, and reduction catalyst such as rhodium coated thereon. Since the three-way catalyst is well known to a person of an ordinary skill in the art, detailed description thereof will be omitted.

The multi-layered portion 54 is the portion other than the single-layered portion 52, and, as shown in FIG. 4, an insulating layer 62, a hydrocarbon trap layer 64 and a three-way catalyst layer 66 are sequentially formed in the multi-layered portion 54.

The insulating layer 62 is disposed close to the inlet channel 42, and prevents heat of the exhaust gas from being transferred to the hydrocarbon trap layer 64 by moisture adsorption. That is, moisture is adsorbed in the insulating layer 62, and the moisture is vaporized by the heat of the exhaust gas when the vehicle starts and temperature of the exhaust gas rises. Therefore, temperature rise of the hydrocarbon trap layer 64 is suppressed. A catalyst that can perform insulation function by the moisture adsorption, for example a catalyst containing zeolite material enabling of the moisture adsorption may be coated on the insulating layer 62.

The hydrocarbon trap layer 64 is made of beta-zeolite, A-type zeolite, X-type zeolite, ZSM-5, USY and so on. The hydrocarbon trap layer 64 absorbs hydrocarbon contained in the exhaust gas when temperature of the exhaust gas is low (lower than or equal to about 150° C.), and releases the absorbed hydrocarbon when the temperature of the exhaust gas is high. That is, the hydrocarbon trap layer 64 traps hydrocarbon contained in the exhaust gas in a case where the temperature of the exhaust gas is low (e.g., initial starting) and the three-way catalyst layer of the single-layered portion 52 and the three-way catalyst layer 66 of the multi-layered portion 54 are not activated. Therefore, it is prevented that hydrocarbon which cannot be purified at initial starting is exhausted to the exterior or the vehicle. The hydrocarbon trap layer 64 is disposed between the insulating layer 62 and the three-way catalyst layer 66.

The three-way catalyst layer 66 is disposed close to the outlet channel 44. The three-way catalyst layer, similar to the first three-way catalyst 30, converts three harmful material (CO, HC, NOx) contained in the exhaust gas into harmless gas (CO2, H2O, N2) through the oxidation-reduction reaction. The three-way catalyst layer 66 is provided with oxygen-storing material such as ceria, oxidation catalyst such as palladium and platinum, and reduction catalyst such as rhodium coated thereon. Since the three-way catalyst is well known to a person of an ordinary skill in the art, detailed description thereof will be omitted.

Meanwhile, since volume density of the zeolite material is lower than that of the three-way catalyst, a length of the single-layered portion 52 may be 10%-50% of a length of the wall 50 and a length of the multi-layered portion 54 may be 50%-90% of the length of the wall 50. In this case, since the zeolite material and the three-way catalyst having almost the same mass are coated on the wall 50, functions of the insulating layer 62 and the hydrocarbon trap layer 64 may be maximized.

In addition, since the single-layered portion 52 without the insulating layer 62 is disposed close to the exhaust gas flowing into the catalytic converter 40, temperature rise of the three-way catalyst layer (in the single-layered portion 52) to activation temperature is prevented from being retarded.

Hereinafter, operation of the catalytic converter according to various embodiments of the present invention will be described in detail.

If the vehicle is started, the engine 10 discharges the exhaust gas and the exhaust gas flows into the catalytic converter 40 through the first three-way catalyst 30. The exhaust gas flowing into the catalytic converter 40 increases temperature of the three-way catalyst layer in the single-layered portion 52, and moves to the outlet channel 44 through the wall 50. In addition, the exhaust gas increases temperature of the three-way catalyst layer 66 in the multi-layered portion 54 when flowing through the outlet channel 44. At this time, the exhaust gas flowing through the inlet channel 42 close to the multi-layered portion 54 vaporizes the moisture adsorbed in the insulating layer 62. In this process, temperature of the exhaust gas is decreased. The exhaust gas having the decreased temperature flows into the outlet channel 44 through the wall 50, but cannot raise temperature of the hydrocarbon trap layer 64 quickly. Therefore, hydrocarbon contained in the exhaust gas is absorbed in the hydrocarbon trap layer 64.

After that, as the exhaust gas flows continuously, temperature of the first three-way catalyst 30 reaches the activation temperature. At this time, temperature of the exhaust gas rises quickly by catalytic reaction. The exhaust gas having the increased temperature raises temperature of the three-way catalyst layer in the single-layered portion 52 to the activation temperature. At this time, temperature of the exhaust gas is further increased by catalytic reaction of the single-layered portion 52.

At this time, temperature of the hydrocarbon trap 64 in the multi-layered portion 54 is increased gradually by the insulating layer 62.

Figure 5:
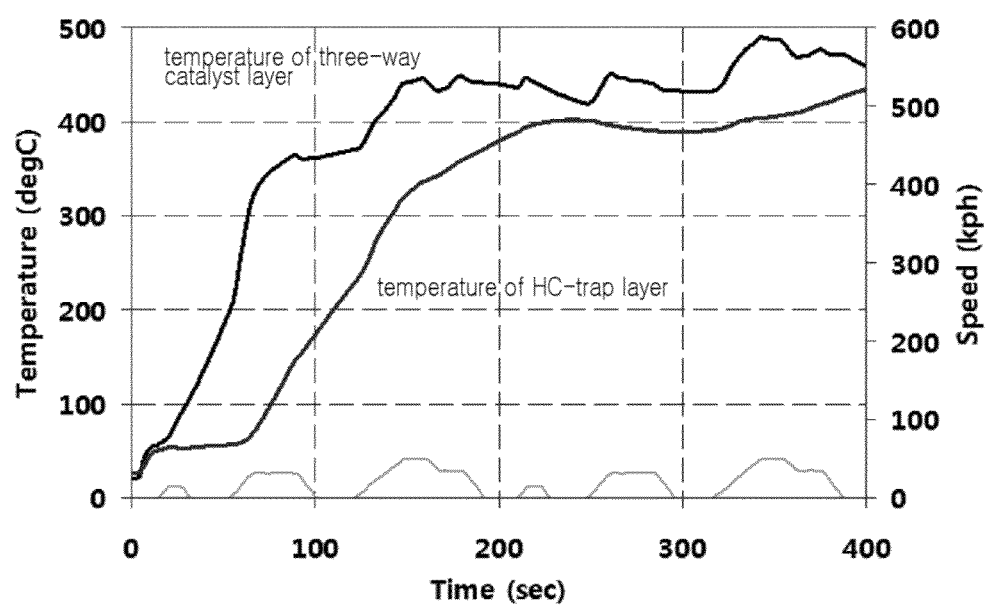
FIG. 5 is a graph illustrating temperatures of a three-way catalyst layer and a hydrocarbon trap layer to a time in an exemplary multi-layered portion according to the present invention.

After that, if temperature of the hydrocarbon trap 64 reaches release temperature (e.g., 150° C.), the absorbed hydrocarbon in the hydrocarbon trap 64 begins to be released. At this time, as shown in FIG. 5, temperature of the three-way catalyst layer 66 reaches activation temperature (e.g., 350° C.). Therefore, the three-way catalyst layer 66 oxidizes the released hydrocarbon and removes carbon monoxide and nitrogen oxide.

As described above, the insulating layer 62 prevents temperature of the hydrocarbon trap layer 64 from increasing to release temperature until temperature of the three-way catalyst layer 66 reaches activation temperature. Therefore, if the hydrocarbon trap layer 64 begins to release hydrocarbon, the three-way catalyst layer 66 reaches activation temperature and can oxidize the released hydrocarbon. Therefore, purifying efficiency of the exhaust gas may be improved.

Since insulating layer retards temperature rise of the hydrocarbon trap layer until the three-way catalyst layer reaches activation temperature, harmful material including hydrocarbon may be effectively purified at initial starting according to various embodiments of the present invention.

In addition, since the three-way catalyst layer, the insulating layer, and the hydrocarbon trap layer are coated on the particulate filter, purifying efficiency of harmful material may be further improved and exhaust of particulate matter may be reduced.

For convenience in explanation and accurate definition in the appended claims, the terms left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A catalytic converter of an internal combustion engine, comprising:
    at least one inlet channel having an end through which an exhaust gas flows into and another end which is blocked;
    at least one outlet channel having an end which is blocked and another end through which the exhaust gas is discharged; and
    a wall defining a boundary between a neighboring inlet channel and outlet channel, and adapted to direct the exhaust gas from the inlet channel to the outlet channel,
    wherein the wall includes a single-layered portion formed at an end portion and having a three-way catalyst layer, and a multi-layered portion being the portion other than the single-layered portion and having a three-way catalyst layer, a hydrocarbon trap layer and an insulating layer, and
    wherein the three-way catalyst layer, the hydrocarbon trap layer and the insulating layer of the multi-layered portion are disposed in a sequence of the insulating layer, the hydrocarbon trap layer and the three-way catalyst layer from the inlet channel toward the outlet channel.

2. The catalytic converter of claim 1, wherein the insulating layer prevents heat of the exhaust gas from being transferred to the hydrocarbon trap layer by moisture adsorption.

3. The catalytic converter of claim 1, wherein a length of the single-layered portion is 10%-50% of a length of the wall, and a length of the multi-layered portion is 50%-90% of the length of the wall.

4. The catalytic converter of claim 1, wherein the catalytic converter is a catalyzed particulate filter in which a catalyst is coated.

5. An apparatus of purifying an exhaust gas comprising:
    an engine generating power by burning fuel and air flowing into a combustion chamber;
    an exhaust pipe through which the exhaust gas generated by the engine passes;
    a first three-way catalyst mounted at an exhaust pipe downstream of the engine, and converting harmful material such as carbon monoxide, hydrocarbon, and nitrogen oxide contained in the exhaust gas into harmless material through an oxidation-reduction reaction; and
    a catalytic converter mounted at the exhaust pipe downstream of the first three-way catalyst, and removing harmful material of the exhaust gas that is not removed at the first three-way catalyst;
    wherein the catalytic converter includes:
        at least one inlet channel having an end through which an exhaust gas flows and another end which is blocked;
        at least one outlet channel having an end which is blocked and another end through which the exhaust gas is discharged; and
        a wall defining a boundary between a neighboring inlet channel and outlet channel, and adapted to direct the exhaust gas from the inlet channel to the outlet channel,
    wherein the wall includes a single-layered portion formed at an end portion and having a three-way catalyst layer, and a multi-layered portion being the portion other than the single-layered portion and having a three-way catalyst layer, a hydrocarbon trap layer and an insulating layer, and
    wherein the three-way catalyst layer, the hydrocarbon trap layer and the insulating layer of the multi-layered portion are disposed in a sequence of the insulating layer, the hydrocarbon trap layer and the three-way catalyst layer from the inlet channel toward the outlet channel.

6. The apparatus of claim 5, wherein the insulating layer prevents heat of the exhaust gas from being transferred to the hydrocarbon trap layer by moisture adsorption.

7. The apparatus of claim 5, wherein a length of the single-layered portion is 10%-50% of a length of the wall, and a length of the multi-layered portion is 50%-90% of the length of the wall.

8. The apparatus of claim 5, wherein the catalytic converter is a catalyzed particulate filter in which a catalyst is coated.

* * * * *